Figure 2:
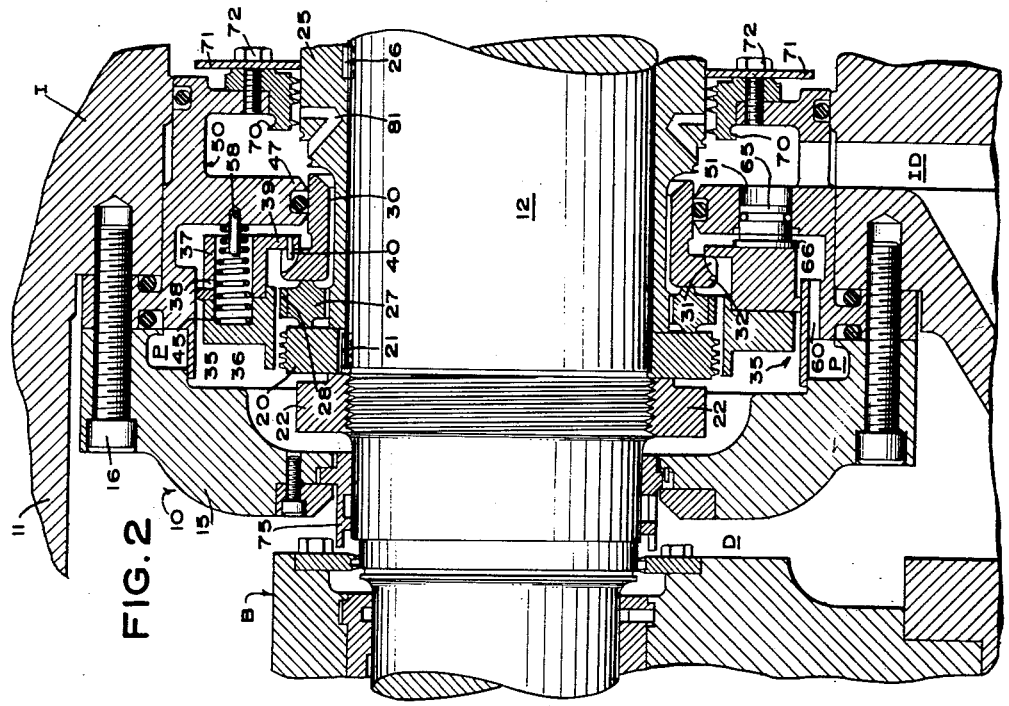

May 22, 1962 R. A. RIESTER 3,035,841
COMPENSATING SEALS
Filed July 30, 1956 2 Sheets-Sheet 1

INVENTOR
ROBERT A. RIESTER
BY Herman Seid
ATTORNEY

INVENTOR
ROBERT A. RIESTER
BY *Herman Seid*
ATTORNEY

United States Patent Office 3,035,841
Patented May 22, 1962

3,035,841
COMPENSATING SEALS
Robert A. Riester, Syracuse, N.Y., assignor to Carrier Corporation, Syracuse, N.Y., a corporation of Delaware
Filed July 30, 1956, Ser. No. 601,063
3 Claims. (Cl. 277—3)

This invention relates to sealing means, more particularly to means facilitating the provision of a seal about a rotary member whereby fluids on opposed sides of said seal will be prevented from intermixing, even under varying pressure conditions of said fluids.

Where rotary members such as shafts or the like are employed, it is often necessary or desirable to provide some means to prevent the passage of fluids along said shaft. Thus, specific sealing applications often require that fluids contacting one part of the rotary shaft be prevented from coming in contact with or intermixing with fluids in contact with another portion of the shaft. Contemporary technological advances in turbo-machinery design have engendered many problems in connection with the maintenance of fluid pressures within the machinery, as well as in the lubrication systems provided for the bearings supporting the journals of the relatively high speed shafts employed. The provision of conventional sealing members, designed to retain specific pressures on opposed faces of said seal is generally inadequate, since the pressures acting on opposed faces of the seal are subject to considerable variations. These variations may arise due to failure of lubricant pumps, in which case there will be a sudden drop in lubricant pressure, or alternatively may be due to shutdown of the turbo-machinery in which case sudden decreases in gas pressure may build up undue stresses in the seal due to maintenance of the lubricant pressure.

"Turbo-machinery" as used herein may be defined as a machine driven by and directly coupled to a turbine. It will be appreciated other prime movers may be employed if desired in place of a turbine. The machine may be a gas or refrigerant compressor such as a centrifugal compressor. Such a compressor includes a housing having a shaft extending therethrough with a series of blade or vane wheels supported on the shaft and arranged to rotate therewith. A portion of the shaft may extend from the housing whereby energy is transmitted to the compressor from the prime mover. As is apparent, the shaft must be supported on bearings to facilitate rapid rotation thereof, and it is obviously necessary to provide some means at the terminal points of the housing where the shaft extends therefrom so as to prevent the relatively high pressure fluids within the housing from leaking along the shaft to the outside. It is additionally desirable to provide for some sealing means insuring separation of the bearing lubricant systems from the fluid system within the compressor. The evolution of seal design has been such that with the advent of relatively high speed shafts, it was found necessary to provide a cooling bath for the components of the seal structure itself. This cooling bath serves to minimize wear of the relatively moving parts of the seal, and serves further to dissipate any heat engendered by the friction between these relatively moving parts. The fluid pressures in the bearing lubricating systems and the fluid pressures in the seal baths, as well as the fluid pressures within the compressor itself are of different magnitudes and of a varying nature. Thus a seal is necessary between the compressor fluid system and the bearing system, and a seal is additionally provided between the bearing lubrication system, and the seal cooling system to prevent admixture of the fluids employed. So-called "Iso-Seal" units have been developed by Carrier Corporation for the purpose of isolating the seal system from any of the other fluid systems involved. These "Iso-Seal" units provide an individual independent fluid system for the seals.

Since the fluid pressures acting on the seal are of a varying nature, any seal structure employed will have to be able to withstand the maximum fluid pressures exerted, and at the same time be capable of functioning efficiently under the entire range of fluid pressure conditions.

It is with the above problems in mind that the present means has been evolved, means providing a seal which restricts available flow paths for the fluid sealed, as a function of the pressures acting upon said seal.

It is accordingly a primary object of this invention to provide an improved sealing means.

A further object of this invention is to provide a sealing means for maintaining different fluid pressures at various points along a rotating shaft.

Another object of this invention is to provide a seal for rotating shafts which regulates the flow paths of the fluids contacting said shaft, as a function of the pressures exerted by said fluids.

It is also an object of this invention to provide an improved sealing structure which changes its configuration subject to the pressures exerted by the fluids sealed.

A further object of this invention is to provide a simple, inexpensive, seal arrangement for use in a compressor, where a seal may be maintained regardless of the types of fluids employed in the compressor and with uniform conditions maintained at all points of the seal.

A feature of the invention resides in the provision of a moving assembly of parts forming a seal about a refrigerant or the like compressor shaft in combination with means for assuring a uniform liquid bath about all points of the seal to provide a relatively cool seal fluid assuring the maintenance of a uniform temperature in the component parts of said seal.

Another feature of the invention resides in the fact that the seal here provided functions to permit use of a split-ring type bearing about the journal portions of the shaft, thus eliminating the more expensive ring type bearing which requires an increase in maintenance costs.

An additional feature of the invention resides in the use of a sealing ring incorporating carbon or graphite for imparting lubricating properties thereto, said ring being positioned between a rotating sealing element on the shaft and a stationary sleeve spaced from the shaft. Means for furnishing oil about all points of said ring, assure a fluid seal film at both sides of the ring between the ring and said rotating and stationary elements.

A further feature of the invention centers about the provision of an isolated fluid system whereby the high pressure in this seal fluid system may be isolated from the relatively low pressure bearing lubrication system, thus permitting the use of split type bearings, which are relatively simple of maintenance and replacement.

A still further feature of the invention centers about the provision of a seal in which the pressure exerted between the component parts of the seal is made a function of the pressures acting on opposite faces of the seal. Thus as the fluid pressures acting on the seal increase, the amount of pressure exerted between the surfaces of the seal increase with a resultant increase in sealing effect.

These objects, and features, as well as additional objects and features which will become apparent in the following disclosures and claims are achieved by provision of a seal structure arranged within the housing of the structure to be sealed, as disclosed, a turbo-compressor, as here envisaged, the invention is shown embodied in an "Iso-Seal" structure as previously described. This "Iso-Seal" structure provides a fluid system, apart from that of the lubrication system or of the gas system within the compressor. Secured to the shaft of the turbo-compressor, is a rotating seal ring member rotating with the shaft. Adjacent this ring, and in face contact therewith, is a free carbon ring seal member, and sandwiching this carbon ring is a non-rotating sleeve seal member mounted for movement only in an axial direction with respect to the shaft. A piston actuated, spring pressed, shifting seal positioning member is arranged to control the axial position of the aforementioned sleeve, and the clearance between the seal members. The pistons governing the positioning of said positioning ring are exposed on one of their faces to the gas pressure which it is desired to seal, and are acted on, on their other faces by the fluid within the "Iso-Seal" structure. The respective magnitudes of the fluid pressures acting on these pistons determines whether the pistons will supply additional sealing force to the seal member.

Figure 1:
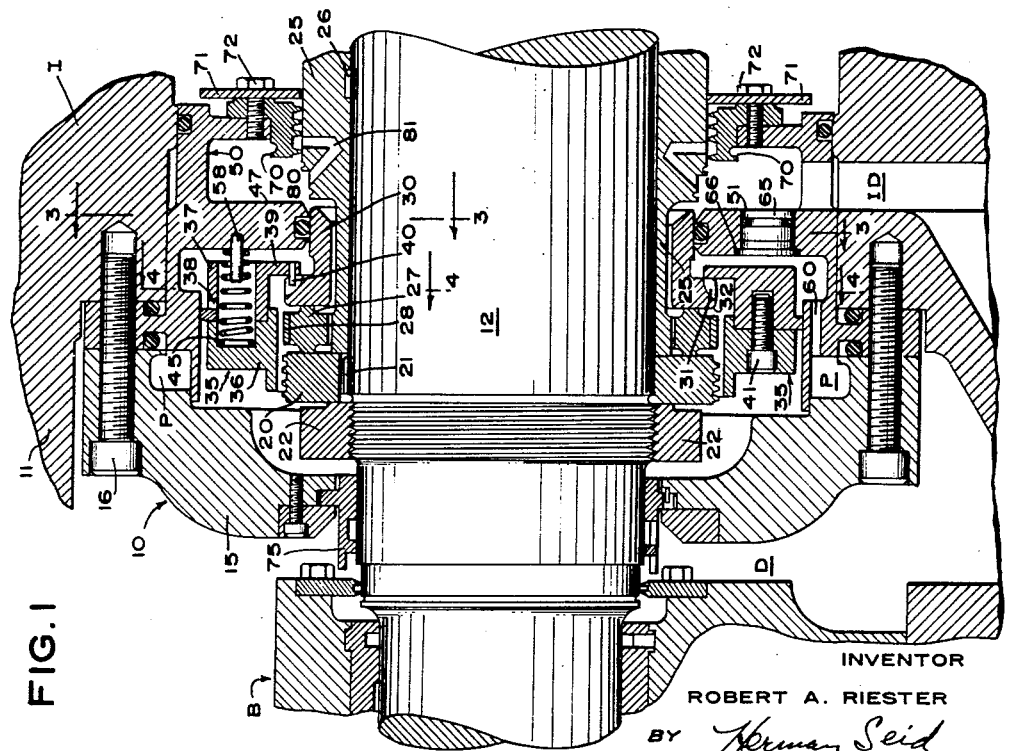
Figure 4:
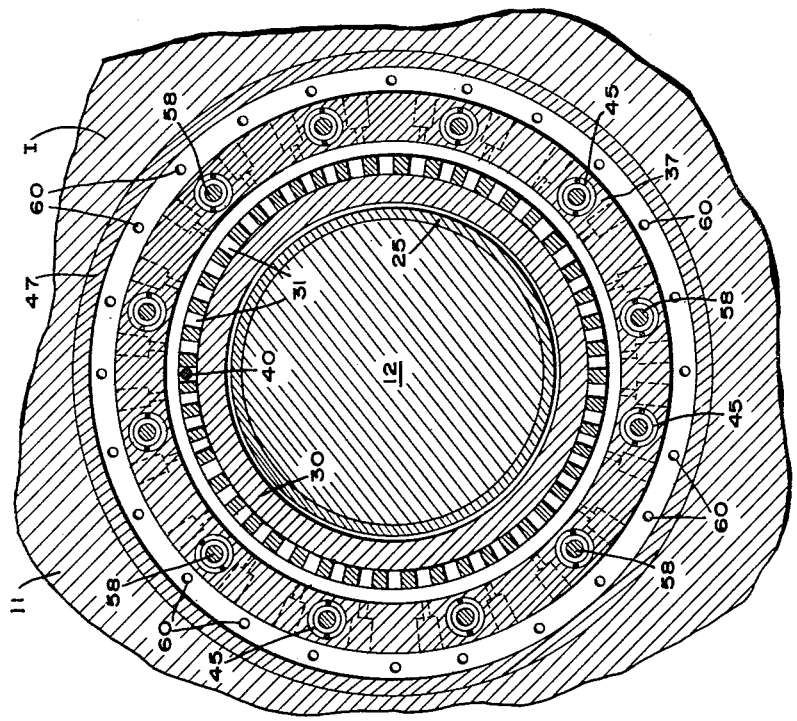
Figure 3:
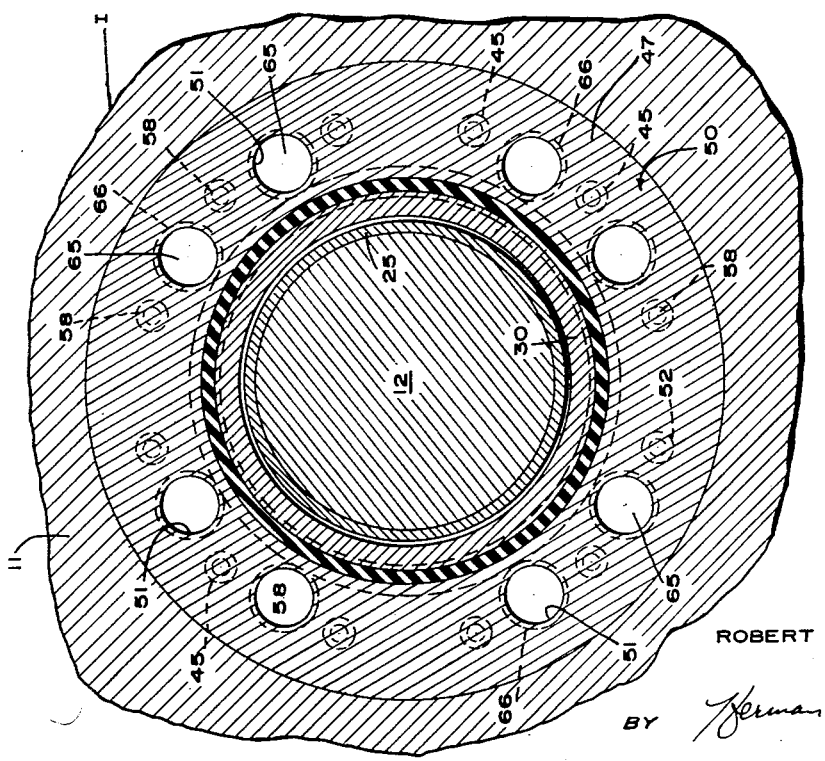

The specific constructional features of a preferred embodiment of this invention and their mode of operation will be made most manifest, and particularly pointed out in conjunction with the accompanying drawings wherein:

FIGURE 1 represents a fragmentary, schematic cross-sectional view through the novel seal structure shown in operative position when the machine is running with full fluid pressures maintained; and FIGURE 2 is a partial fragmentary cross-sectional view through the seal shown when the machine is in a shut down condition with a drop in fluid pressure, in the seal system; and FIGURE 3 is a cross-sectional view taken on line 3—3 of FIGURE 1 illustrating the respective positions of the springs and the pistons; and FIGURE 4 is a cross-sectional view on line 4—4 of FIGURE 1, through the positioning member and the non-rotating sleeve seal member.

Referring now more particularly to the drawings, like numerals in the various figures will be taken to designate like parts.

As illustrated in the drawings, the seal 10 is arranged to be mounted as an extension of the housing 11, of the machine to be sealed. Shaft 12 extends through the housing wall through a bearing (to the left of FIGURES 1 and 2 and not here illustrated).

The seal structure 10 having a housing portion 15 is secured by machine bolts 16 or the like to the compressor housing 11. This seal housing 15 is designed to be relatively fluid tight, whereby a fluid system may be encased therein.

Rotating seal ring 20 is keyed by key 21 to shaft 12 to rotate therewith. Lock nut 22 secures the rotating seal ring 20, and its key 21 in position on the shaft 12. Adjacent rotating seal ring 20 is sleeve 25 suitably secured to shaft 12, for example, as by means of key 26, to rotate with said shaft. A free sealing member 27 in the shape of a ring is mounted about sleeve 25, at a spaced distance therefrom, adjacent rotating seal ring 20. This sealing member 27 is preferably formed of carbon or the like material and is provided with a strengthening ring 28 of steel or the like. A non-rotating sleeve seal 30 is mounted to sandwich sealing member 27. Non-rotating shiftable sleeve seal 30 is arranged to move only axially with respect to the shaft 12, and is fixed against rotational movement in a manner to become hereinafter more apparent. A series of spaced arcuate slots 31 as best seen in FIGURE 4 are formed in bearing flange 32 of this seal 30. Positioning means for shifting non-rotating sleeve seal 30 are provided in the form of an annular spring retainer 35 arranged about the aforementioned sealing elements 20, 27 and 30.

Shifting or positioning retainer 35 is formed in two parts, a closed outboard part 36, and an open inboard part 37. Open inboard part 37 is formed with port 38 through which fluid may flow. An inwardly extending flange 39 on inboard part 37 bears against non-rotating sleeve seal 30. A pin 40 engages in one of the arcuate slot 31 of sleeve seal 30, as seen in FIGURES 1 and 4. Bolt 41 maintains the parts 36 and 37 in assembled relation.

Springs 45 are mounted in compression in positioning retainer 35, with one end of each spring operating against the outboard closed end of the retainer, and the other end of each spring bearing against a flange 47 of piston supporting housing assembly 50.

The housing assembly 50 is annular in shape and surrounds each of the aforementioned components, as shown in FIGURES 1 and 2. As best seen in FIGURE 3, the housing assembly is formed with a series of spaced piston receiving cylindrical apertures 51 and a series of spaced spring-pin apertures 52. In the illustrated preferred embodiment of this invention, eight piston apertures are provided, and twelve spring pin apertures are provided. Pins 58 are inserted into the latter to support springs 45 as seen in FIGURES 1 and 2. A series of fluid passageways 60 are formed in the housing for a purpose to become hereinafter more apparent. The housing 50 is retained in a fixed position with respect to the machine housing 11 by means of bolts 16.

Pistons 65 are positioned in cylindrical apertures 51. Flange 66 on the piston limits its inboard motion as viewed in FIGURE 1. Outboard motion is restricted by flange 66 coming into contact with positioning retainer 35.

The portion of the shaft surrounded by housing assembly 50 is made substantially fluid tight by means of seal members. A labyrinth seal 70 and a windage plate 71 are secured by means of bolt 72 to the inboard end of housing assembly 50 as seen in FIGURES 1 and 2. At the outboard end, a wiper seal 75 is secured to housing 15 as illustrated.

As seen in FIGURES 1 and 2, suitable gasketing, preferably in the form of O rings are arranged about the piston 65 and housing assembly 50 for a purpose to become hereinafter more apparent.

*Operation*

As previously discussed, the seal structure here disclosed is particularly designed to provide an independent fluid system as a seal between the gas containing portion of a compressor, and the lubrication system for the shaft supporting bearings of said compressor.

The bearing portion B at the outboard end of the shaft as seen in FIGURES 1 and 2 is of a conventional type. The inboard portion I of the compressor to the right in FIGURES 1 and 2 is provided with conventional seal 70 as viewed in FIGURES 1 and 2. The sealing system here provided serves to insure that there will be no admixture of the fluids in the compressor with those of the bearing lubrication system. This is accomplished by providing a specific fluid seal system interposed between the bearing lubrication system and the compressor gas system. This fluid system is contained within housing 15 and housing assembly 50.

Fluid is admitted to the seal system through port P whence it passes through passageway 60 about spring retainer 35. Fluid is admitted into the spring cavity through ports 38 of the inboard part 37 of retainer 35. The fluid then flows towards the shaft 12 through arcuate slots 31 which set the fluid into turbulence to wash and cool the surfaces of the seal components 30, 27 and 20 from which the flow paths lead to wiper seal 75. Any leakage past wiper seal 75 drains through drain D.

The gas from the compressor may leak past labryinth 70. This leakage is resisted by a windage plate 71 which tends to centrifuge any gas coming into contact therewith, but in the event of some leakage, the leakage past the labryinth 70 is set into turbulence in chamber 80 by means of channel 81. The pressures of the seal fluid system are such that any leakage of fluid past free sealing member 27 will be sealing system fluids so that the fluid flow will be towards the inboard end of the machine 11. Leaking fluid will generally be drained off through inboard drain ID.

In operating position, as viewed in FIGURE 1, the piston will normally be forced by the action of the seal fluid system so that flange 66 is in the position illustrated remote from spring housing 35. The clearance between seal members 20, 27 and 30 will thus be dependent in part on the spring pressure exerted by springs 45. It will be observed that spring housing flange 39 bears against sleeve seal 30 to move same in an outboard action axially of shaft 12.

In the event that for some reason the seal fluid system pressures decrease below those of the process gas system pressures, the pistons 65 will be moved outwardly as viewed in FIGURE 2 and flange 66 of the pistons will force spring retainer 35 in an outboard direction thereby causing retainer flange 39 to shift seal 30 to increase sealing pressure between the seal components.

Pin 40 on flange 39 engages sleeve seal 30 to secure it against rotational movement.

It will be observed that the aforegoing structure, though described in conjunction with an "Iso-Seal" arrangement, may easily be embodied for varying sealing pressure between seal members employed between a lubrication system and a pressure gas system. In such situations, the bearing lubrication pressures will be maintained higher than the process gas pressures, thus upon a breakdown of the lubrication system, the clearance between sealing elements will be diminished to prevent the escape of process gas.

As here employed the term "clearance" signifies the distance between relatively moving parts, that is, the spaces which exist between the parts despite the existence of fluid pressures urging the parts toward substantial contact.

The above disclosure has been given by way of illustration and elucidation, and not by way of limitation, and it is desired to protect all embodiments of the herein disclosed inventive concept within the scope of the appended claims.

I claim:

1. Sealing means for controlling passage of fluid along a shaft comprising a rotating seal ring fixed to the shaft to rotate therewith; a non-rotating sleeve mounted in spaced relation to the shaft and axially movable with respect thereto; and means for urging the sleeve into sealing relation with said rotating seal ring, said means including a sleeve engaging positioning member, spring means normally urging said sleeve-engaging member into engagement with said sleeve, a first body of fluid under pressure, means forming a chamber for the accommodation of a second body of fluid under pressure, piston means having a first surface subject to pressure of the first body of fluid and a second surface subject to pressure by the second fluid, said piston means being operative to contact the sleeve-engaging member to maintain the sleeve and ring in sealing relation when the pressure of said second fluid exceeds the pressure of said first fluid by a predetermined amount.

2. In a fluid handling machine including a rotary shaft, shaft sealing means comprising a first member secured to said shaft and having a rotational sealing surface, a second member axially slidable in relation to said shaft and having a stationary sealing surface and a sealing member interposed between said first and second members means forming with the machine a chamber for the accommodation of the shaft-sealing means and a body of fluid under pressure greater than the pressure of the fluid in the machine, means for preventing escape of fluid from the machine upon reduction of the fluid pressure in the chamber, said means comprising resilient means urging the second member into engagement with the sealing member; means providing a passage for fluid under pressure in said chamber to augment the action of said resilient means and means operable in the absence of fluid pressure in said chamber for augmenting the resilient means to maintain the engagement between said sealing member and said sealing surfaces, said last-mentioned means being operative in response to a predetermined relationship between the pressure of the two bodies of fluid.

3. The invention set forth in claim 2 wherein said last-mentioned means includes a plurality of pistons for engaging the resilient means.

References Cited in the file of this patent
UNITED STATES PATENTS

| | | |
|---|---|---|
| 1,097,074 | Bennett | May 19, 1914 |
| 1,983,392 | Nelsson | Dec. 4, 1934 |
| 2,096,899 | Hornschuch | Oct. 26, 1937 |
| 2,505,968 | Jack | May 2, 1950 |
| 2,554,595 | Smith | May 29, 1951 |
| 2,761,712 | Ecker | Sept. 4, 1956 |

UNITED STATES PATENT OFFICE
CERTIFICATE OF CORRECTION

Patent No. 3,035,841                             May 22, 1962

Robert A. Riester

It is hereby certified that error appears in the above numbered patent requiring correction and that the said Letters Patent should read as corrected below.

Column 3, line 75, for "slot" read -- slots --; column 4, lines 65 and 69, for "labryinth", each occurrence, read -- labyrinth --; column 6, line 18, after "members" insert a comma.

Signed and sealed this 14th day of May 1963.

(SEAL)
Attest:

ERNEST W. SWIDER                                  DAVID L. LADD
Attesting Officer                                     Commissioner of Patents